(12) United States Patent
Yang

(10) Patent No.: US 6,962,421 B2
(45) Date of Patent: Nov. 8, 2005

(54) FULL-SIZE FOLDING MIRROR AND CARRY CASE APPARATUS

(76) Inventor: Peter Yang, 810 Ellis Ave., Wheaton, IL (US) 60187

( * ) Notice: Subject to any disclaimer, the term of this patent is extended or adjusted under 35 U.S.C. 154(b) by 34 days.

(21) Appl. No.: 10/607,876

(22) Filed: Jun. 28, 2003

(65) Prior Publication Data

US 2004/0008434 A1 Jan. 15, 2004

Related U.S. Application Data

(60) Provisional application No. 60/394,743, filed on Jul. 11, 2002.

(51) Int. Cl.$^7$ ......................... G02B 7/182; G02B 7/188; A47G 1/02; A47G 1/17; A45D 42/24
(52) U.S. Cl. ........................ 359/846; 359/838; 359/871; 248/467; 248/472; 248/489; 132/316
(58) Field of Search ................................ 132/291, 296, 132/301, 304, 316; D6/300, 301; 248/467, 472, 489; 359/486, 489, 847, 850, 851, 854, 855, 870, 871, 879, 882, 880, 838, 872

(56) References Cited

U.S. PATENT DOCUMENTS

| 365,183 | A | * | 6/1887 | Hufeland | 359/854 |
|---|---|---|---|---|---|
| 1,005,731 | A | * | 10/1911 | Miles | 359/851 |
| 1,121,785 | A | * | 12/1914 | Ballard | 359/851 |
| 1,830,364 | A | * | 11/1931 | Knudson | 160/25 |
| 1,957,847 | A | * | 5/1934 | Peters | 359/851 |
| 2,124,146 | A | * | 7/1938 | Miller | 359/851 |
| 2,140,069 | A | * | 12/1938 | Bostwick | 359/854 |
| 2,461,421 | A | * | 2/1949 | Winifred | 132/316 |
| 2,800,127 | A | * | 7/1957 | Flynn, Jr. | 126/553 |
| 3,996,947 | A | * | 12/1976 | Szpur et al. | 132/316 |
| 4,056,309 | A | * | 11/1977 | Harbison et al. | 359/847 |
| 4,146,308 | A | * | 3/1979 | Cohen | 359/865 |
| 4,397,526 | A | | 8/1983 | Van Deursen | |
| 5,222,000 | A | | 6/1993 | Adler | |
| 5,270,871 | A | | 12/1993 | Florian | |
| D370,129 | S | * | 5/1996 | Freudenfeld | D6/301 |
| 5,625,500 | A | * | 4/1997 | Ackerman | 359/841 |
| 5,772,036 | A | * | 6/1998 | Muncy et al. | 206/581 |
| 5,997,146 | A | | 12/1999 | Denham et al. | |
| 6,113,242 | A | | 9/2000 | Marker et al. | |

FOREIGN PATENT DOCUMENTS

| DE | 3544718 A1 | * | 6/1987 |
|---|---|---|---|
| FR | 2 600 511 A1 | * | 12/1987 |
| JP | 10-192068 A | * | 7/1998 |

* cited by examiner

Primary Examiner—John Juba, Jr.

(57) ABSTRACT

A folding full length mirror and carry apparatus includes a foldable reflective surface support assembly which includes support panels connected together with panel-interconnection hinges. A non-folded reflective surface assembly is supported by the foldable reflective surface support assembly. Preferably, a handle is connected to the foldable reflective surface support assembly. A shoulder strap can be connected to the foldable reflective surface support assembly. Preferably, a folded condition locking assembly is connected to the foldable reflective surface support assembly for retaining the apparatus in a folded up, carrying condition. With one embodiment of the invention, the non-folded reflective surface assembly includes panel-mounted non-folded reflective surfaces mounted one side of each of the respective support panels. With another embodiment of the invention, the reflective surface assembly includes a reflective rollable non-folded sheet wound on a roller assembly supported by the foldable reflective surface support assembly.

14 Claims, 7 Drawing Sheets

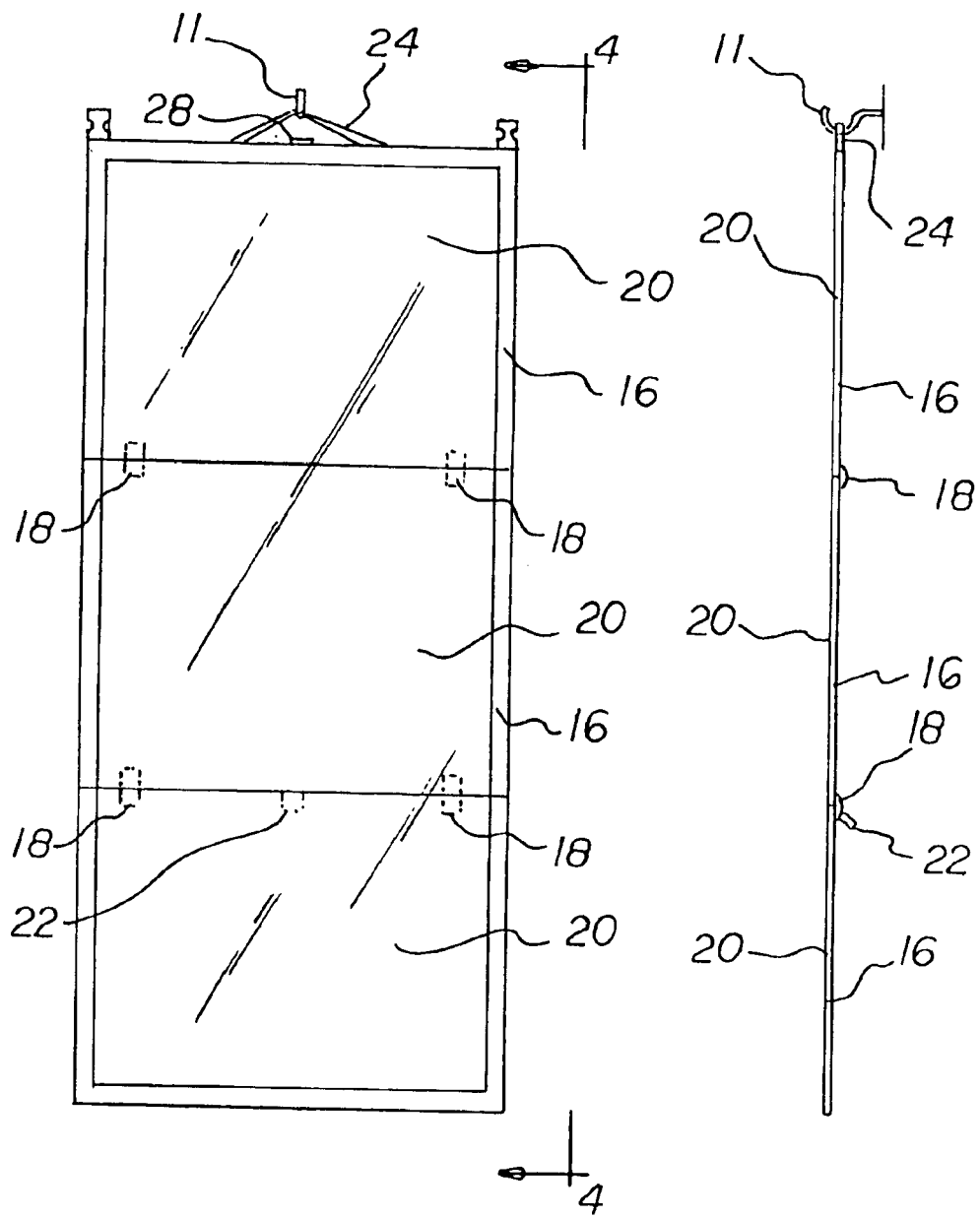

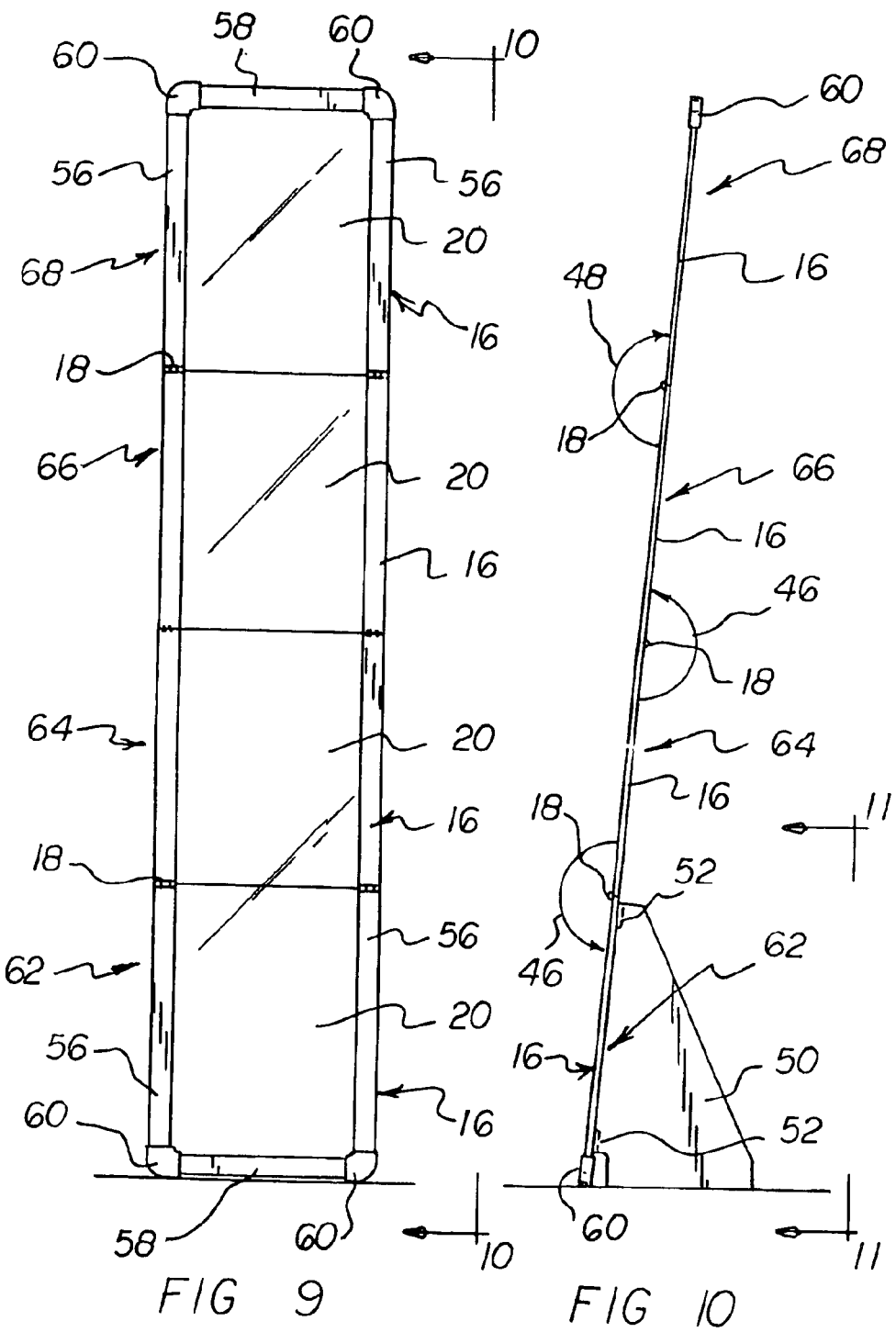

FIG 13
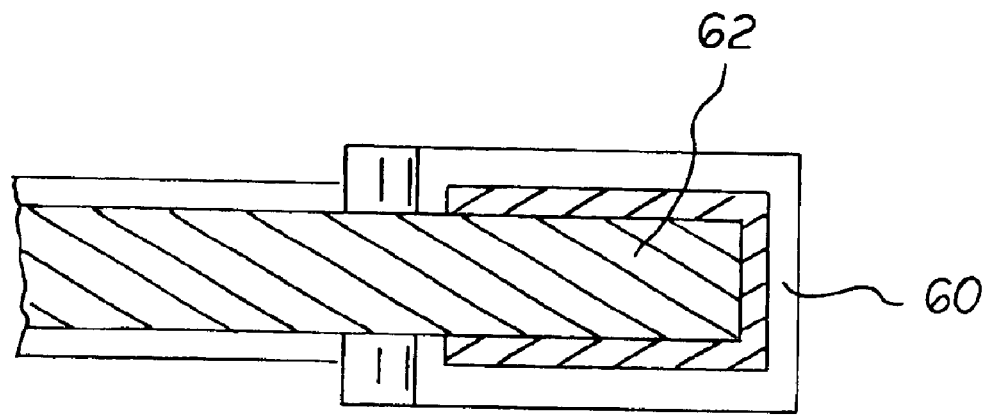
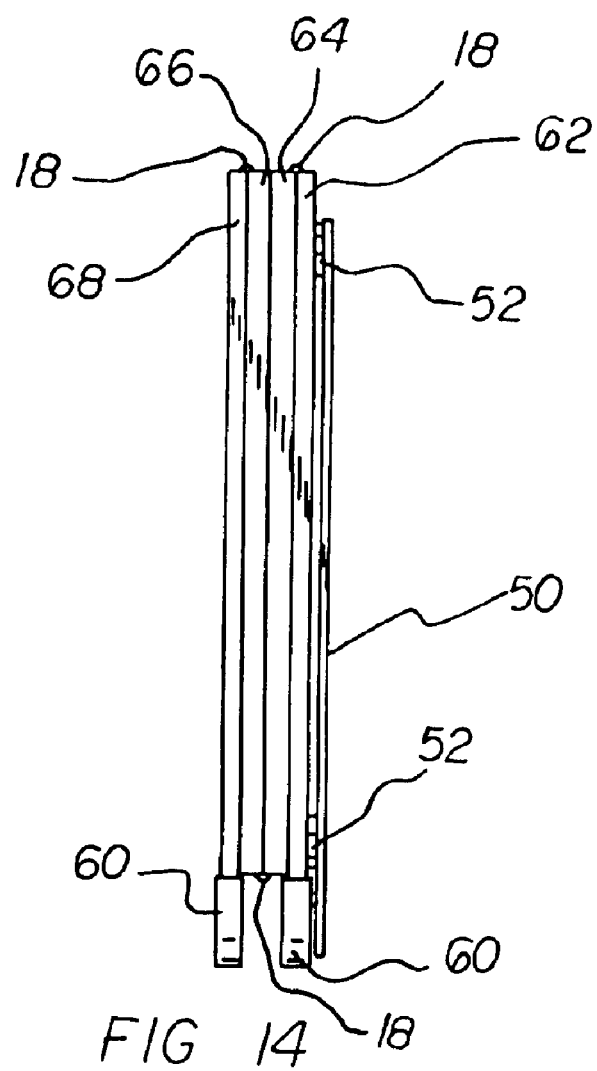
FIG 14

FULL-SIZE FOLDING MIRROR AND CARRY CASE APPARATUS

CROSS-REFERENCE TO RELATED APPLICATION

This application claims priority based upon my copending Provisional Application Ser. No. 60/394,743; filed Jul. 11, 2002.

BACKGROUND OF THE INVENTION

1. Field of the Invention

The present invention relates generally to mirrors and, more particularly, to mirrors that are portable and that are especially adapted for being folded up and carried when not in use.

2. Description of the Prior Art

Generally, it is well known to use portable mirrors that can be carried in a convenient device when not in use, such as in a pocket book, and removed from the carrying device and used when needed. Such mirrors have a relatively small reflective surface. In this respect, it would be desirable to provide a portable mirror which has a relatively large reflective surface.

There is a specific patent known in the prior art, U.S. Pat. No. 4,397,526, which discloses a foldable mirror device which has two foldable mirror support structures which support a unitary reflective surface which is folded when the device is folded. As a result, the unitary reflective surface may have fold line that will create distortion when in open position. To avoid the formation of a fold line, the flexible sheet generally when folded is allowed by the space 34 between the back up panels to assume a tear-drop shape 36 of a general diameter that depends on the thickness of the flexible sheet and material used. The fundamental reason why a fold line may be formed is due to the fact that the unitary reflective surface is itself folded during storage. To avoid this problem entirely, it would be desirable if a foldable mirror apparatus were provided in which the reflective surface itself is not folded when the foldable mirror is folded up.

The following U.S. patents may also be of interest for their disclosure of mirror devices: U.S. Pat. Nos. 5,222,000, 5,270,871, 5,997,146, and 6,113,242. Yet, none of these devices are foldable into more compact units for portability and transport when the mirror is not in use.

Still other features would be desirable in a foldable mirror device. Not only would it be desirable for a foldable mirror to relatively larger than a small portable mirror, it would be desirable if a foldable mirror were provided that folded out into a full-size mirror. Once the full-size mirror is unfolded, it would be desirable to be able to support the full-size mirror in a vertical orientation so that it can be easily used. In this respect, it would be desirable to be able to support the full-size mirror on a wall. In this respect, it would be desirable to be able to support the full-size mirror on a hook installed in a wall or other vertical surface. For walls or other vertical surfaces that don't have a hook installed therein, it would be desirable to be able to support the full-size mirror with suction cups on a wall or other vertical surface.

There may be times when it would not be convenient or desirable to support the full-size mirror on any vertical surface at all. At such a time, it would be desirable to be able to support the full-size mirror on the floor. Moreover, if the full-size mirror is supported on the floor, it would be desirable if a floor support is provided which is also foldable along with the foldable mirror.

Thus, while the foregoing body of prior art indicates it to be well known to use a foldable mirror, the prior art described above does not teach or suggest a full-size folding mirror and carry case apparatus which has the following combination of desirable features: (1) provides a portable mirror which has a relatively large reflective surface; (2) provides a reflective surface which is not folded when the foldable mirror is folded up; (3) provides a full-size mirror; (4) provides for supporting the full-size mirror in a vertical orientation; (5) provides for supporting the full-size mirror on a hook installed in a wall or other vertical surface; (6) provides for supporting the full-size mirror with suction cups on a wall or other vertical surface; (7) provides for supporting the full-size mirror on the floor; and (8) provides a floor support which is also foldable along with the foldable mirror. The foregoing desired characteristics are provided by the unique full-size folding mirror and carry case apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a folding full length mirror and carry apparatus which includes a foldable reflective surface support assembly which includes support panels connected together with panel-interconnection hinges. A non-folded reflective surface assembly is supported by the foldable reflective surface support assembly. Preferably, a handle is connected to the foldable reflective surface support assembly. A shoulder strap can be connected to the foldable reflective surface support assembly. Preferably, a folded condition locking assembly is connected to the foldable reflective surface support assembly for retaining the apparatus in a folded up, carrying condition.

With one embodiment of the invention, the non-folded reflective surface assembly includes panel-mounted non-folded reflective surfaces mounted one side of each of the respective support panels.

The folded condition locking assembly includes a folded condition first locking member which is connected to one of the support panels. A folded condition second locking member is connected to another of the support panels, such that the foldable reflective surface support assembly is locked in the folded up, carrying condition.

With another embodiment of the invention, the non-folded reflective surface assembly includes a roller assembly housing which is connected to the foldable reflective surface support assembly. A roller assembly is retained in the roller assembly housing, and a reflective rollable (flexible) non-folded sheet is supported by the roller assembly.

The folded condition locking assembly includes a folded up first panel lock member which is connected to the roller assembly housing, and a folded up second panel lock member is connected to the foldable reflective surface support assembly.

An extended reflective rollable sheet locking assembly is connected between the reflective rollable non-folded sheet and the foldable reflective surface support assembly. Preferably, the extended reflective rollable sheet locking assembly includes a sheet-attached ring connected to a distal end of the reflective rollable non-folded sheet. A support-assembly-attached hook is connected to the foldable reflective surface support assembly. Also, suction cups can be connected to the foldable reflective surface support assembly. Either the hook or the suction cups can be used to support the apparatus in the fully unfolded condition on a wall surface.

With yet another embodiment of the invention, a horizontal-surface-supported mirror support member is provided, and interconnection means are provided for connecting the horizontal-surface-supported mirror support member to a bottommost support panel. Preferably, the interconnection means include support-member-to-support-panel hinges.

A topmost support panel and a bottommost support panel can include a pair of longitudinal side portions. For each topmost and bottommost panel, a transverse portion and a pair of interconnection elbows are connected between the longitudinal side portions and the transverse portion. The bottommost interconnection elbows serve as feet members for the apparatus when the apparatus is supported on a floor or other horizontal surface.

The panel-interconnection hinges for successive support panels can be located on opposite sides of the successive support panels.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved full-size folding mirror and carry case apparatus which has all of the advantages of the prior art and none of the disadvantages.

It is another object of the present invention to provide a new and improved full-size folding mirror and carry case apparatus which may be easily and efficiently manufactured and marketed.

It is a further object of the present invention to provide a new and improved full-size folding mirror and carry case apparatus which is of durable and reliable construction.

An even further object of the present invention is to provide a new and improved full-size folding mirror and carry case apparatus which is susceptible of a low cost of manufacture with regard to both materials and labor, and which accordingly is then susceptible of low prices of sale to the consuming public, thereby making such full-size folding mirror and carry case apparatus available to the buying public.

Still yet a further object of the present invention is to provide a new and improved full-size folding mirror and carry case apparatus which provides a portable mirror which has a relatively large reflective surface.

Still another object of the present invention is to provide a new and improved full-size folding mirror and carry case apparatus that provides a reflective surface which is not folded when the foldable mirror is folded up.

Yet another object of the present invention is to provide a new and improved full-size folding mirror and carry case apparatus which provides a full-size mirror.

Even another object of the present invention is to provide a new and improved full-size folding mirror and carry case apparatus that provides for supporting the full-size mirror in a vertical orientation.

Still a further object of the present invention is to provide a new and improved full-size folding mirror and carry case apparatus which provides for supporting the full-size mirror on a hook installed in a wall or other vertical surface.

Yet another object of the present invention is to provide a new and improved full-size folding mirror and carry case apparatus that provides for supporting the full-size mirror with suction cups on a wall or other vertical surface.

Still another object of the present invention is to provide a new and improved full-size folding mirror and carry case apparatus which provides for supporting the full-size mirror on the floor.

Yet another object of the present invention is to provide a new and improved full-size folding mirror and carry case apparatus that provides a floor support which is also foldable along with the foldable mirror.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a front view of the embodiment of the full-size folding mirror and carry case apparatus of FIG. 2 in the fully unfolded condition and hanging from a hook on a wall.

FIG. 4 is a side view of the embodiment of the invention shown in FIG. 3 taken along line 4—4 thereof.

FIG. 9 is a front view of a third embodiment of the full-size folding mirror and carry case apparatus in a fully unfolded condition, and which includes a support assembly for supporting the apparatus on a floor or other horizontal surface.

FIG. 10 is a side view of the embodiment of the invention shown in FIG. 9 taken along line 10—10 thereof.

FIG. 13 is an enlarged partial cross-sectional view of the embodiment of the invention shown in FIG. 12 contained in circled region 13 thereof.

FIG. 14 is a side view of the embodiment of the invention shown in FIGS. 9–13 in a folded up, carrying condition.

DESCRIPTION OF THE PREFERRED EMBODIMENT

Figure 1:
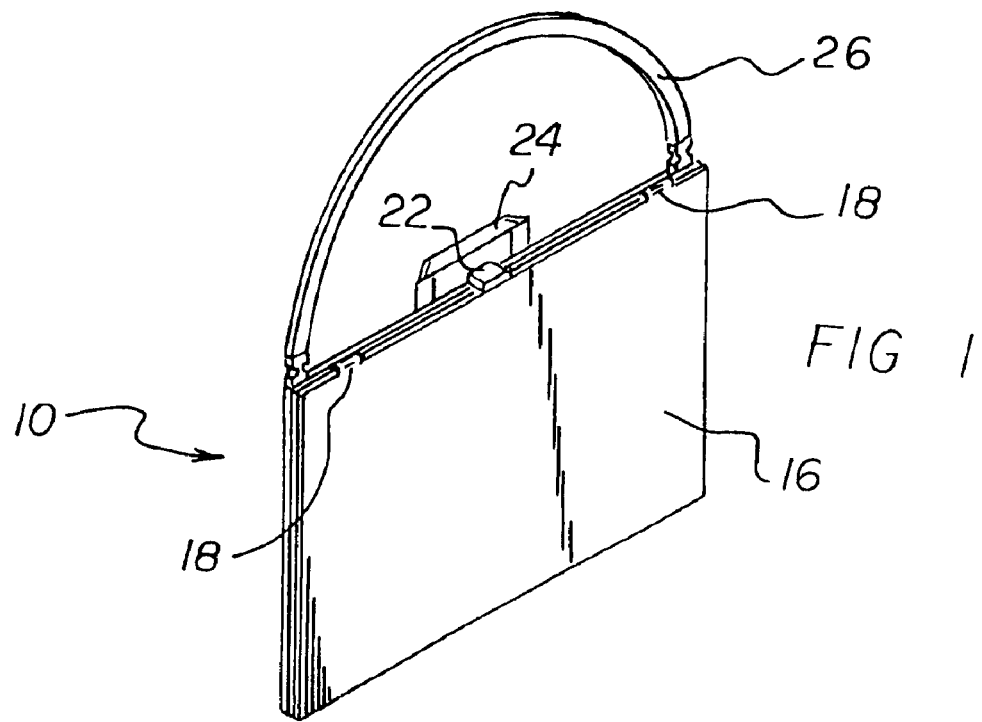
FIG. 1 is a perspective view showing a first embodiment of the full-size folding mirror and carry case apparatus of the invention in a folded up, carrying condition.

With reference to the drawings, a new and improved full-size folding mirror and carry case apparatus embodying the principles and concepts of the present invention will be described.

Turning to FIGS. 1–4, there is shown a first embodiment of the full-size folding mirror and carry case apparatus of the invention generally designated by reference numeral 10. In the first embodiment, full-size folding mirror and carry case apparatus 10 includes a foldable reflective surface support assembly which includes support panels 16 connected together with panel-interconnection hinges 18. A non-folded reflective surface assembly is supported by the foldable reflective surface support assembly. It is noted that the support panels 16 are folded around the panel-interconnection hinges 18. However, each non-folded reflective surface in the non-folded reflective surface assembly is not folded within itself. Therefore, there are no fold lines in each non-folded reflective surface. Preferably, a handle 24 is connected to the foldable reflective surface support assembly. A shoulder strap 26 can be connected to the foldable reflective surface support assembly. Preferably, a folded condition locking assembly is connected to the foldable reflective surface support assembly for retaining the apparatus in a folded up, carrying condition.

As shown in the first embodiment of the invention, in FIGS. 1–4, the non-folded reflective surface assembly includes panel-mounted non-folded reflective surfaces 20 mounted one side of each of the respective support panels 16.

The folded condition locking assembly includes a folded condition first locking member 22 which is connected to one of the support panels 16. A folded condition second locking member 28 is connected to another of the support panels 16, such that the foldable reflective surface support assembly is locked in the folded up, carrying condition.

Figure 2:
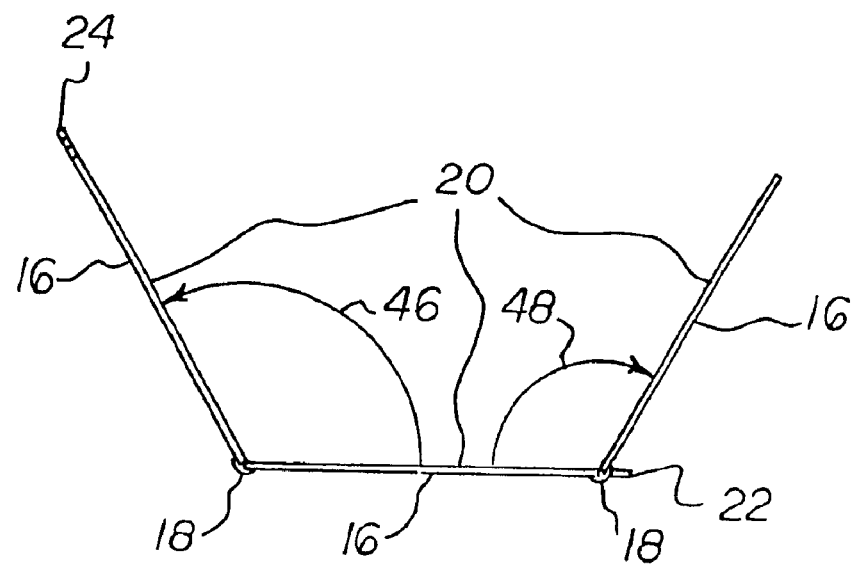
FIG. 2 is a side view of the embodiment of the full-size folding mirror and carry case apparatus shown in FIG. 1 in the process of being unfolded.

To use the first embodiment of the invention, the apparatus is unfolded from the folded up, carrying condition shown in FIG. 1. The folded condition first locking member 22 is disengaged from the folded condition second locking member 28. As shown in FIG. 2, the right end support panel 16 is rotated as shown by the clockwise unfolding arrow 48 around associated panel-interconnection hinges 18. The left end support panel 16 is rotated as shown by the counter-clockwise unfolding arrow 46 around associated panel-interconnection hinges 18.

As shown in FIGS. 3 and 4, the apparatus is in the fully unfolded condition. The three panel-mounted non-folded reflective surfaces 20 shown in the drawings form a full length mirror. The handle 24 can serve an additional function of hanging the fully unfolded mirror on a hook 11 that is supported by a wall or other vertical structure.

When the full-size folding mirror of the invention is to be transported to another location, the apparatus is removed from the hook 11 and folded up into the folded up, carrying condition shown in FIG. 1. The folded condition first locking member 22 is engaged with the folded condition second locking member 28 to secure the apparatus in the folded up, carrying condition.

Turning to FIGS. 5–8, a second embodiment of the invention is shown. Reference numerals are shown that correspond to like reference numerals that designate like elements shown in the other figures. In addition, the non-folded reflective surface assembly includes a roller assembly housing 32 which is connected to the foldable reflective surface support assembly. A roller assembly 34 is retained in the roller assembly housing 32, and a reflective rollable (flexible) non-folded sheet 36 is supported by the roller assembly 34.

The folded condition locking assembly includes a folded up first panel lock member 42 which is connected to the roller assembly housing 32, and a folded up second panel lock member 44 is connected to the foldable reflective surface support assembly.

An extended reflective rollable sheet locking assembly is connected between the reflective rollable non-folded sheet 36 and the foldable reflective surface support assembly. Preferably, the extended reflective rollable sheet locking assembly includes a sheet-attached ring 40 connected to a distal end of the reflective rollable non-folded sheet 36. A support-assembly-attached hook 41 is connected to the foldable reflective surface support assembly. Also, suction cups 30 can be connected to the foldable reflective surface support assembly.

Figure 5:
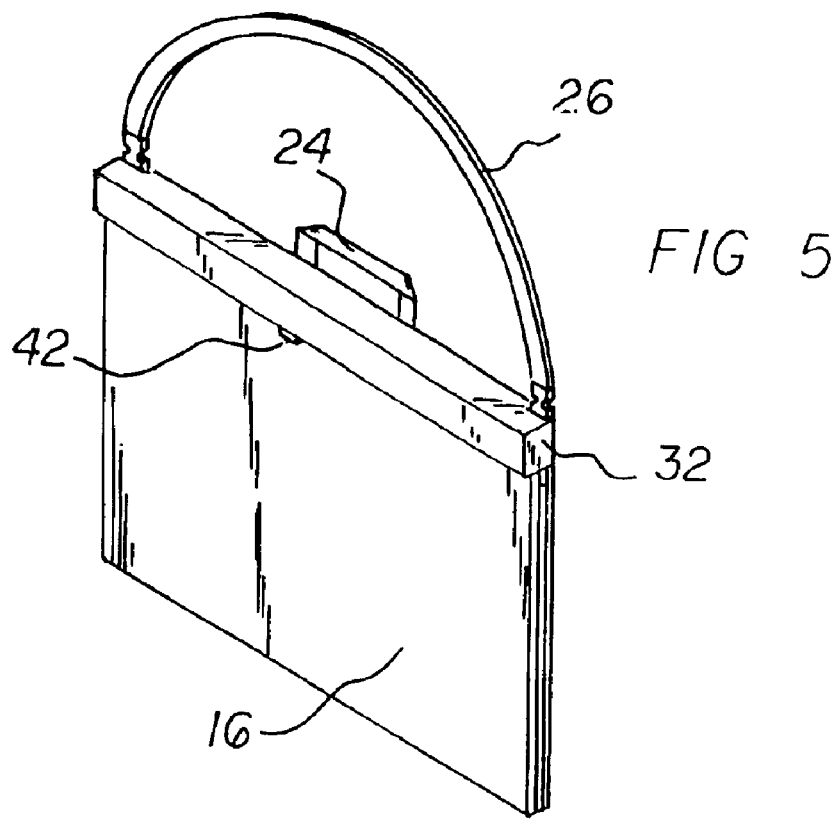
FIG. 5 is a perspective view showing a second embodiment of the full-size folding mirror and carry case apparatus of the invention in a folded up, carrying condition.
Figure 6:
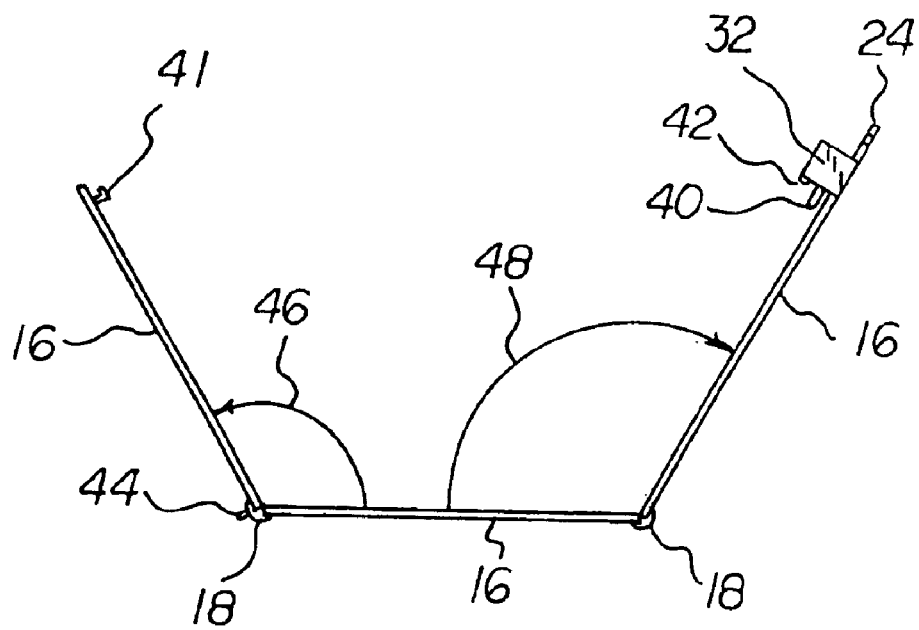
FIG. 6 is a side view of the embodiment of the full-size folding mirror and carry case apparatus shown in FIG. 5 in the process of being unfolded.

To use the second embodiment of the invention, the apparatus is unfolded from the folded up, carrying condition shown in FIG. 5. The folded up first panel lock member 42 is disengaged from the folded up second panel lock member 44, and as shown in FIG. 6, the right end support panel 16 is rotated as shown by the clockwise unfolding arrow 48 around associated panel-interconnection hinges 18. The left end support panel 16 is rotated as shown by the counter-clockwise unfolding arrow 46 around associated panel-interconnection hinges 18.

Figures 7, 8:
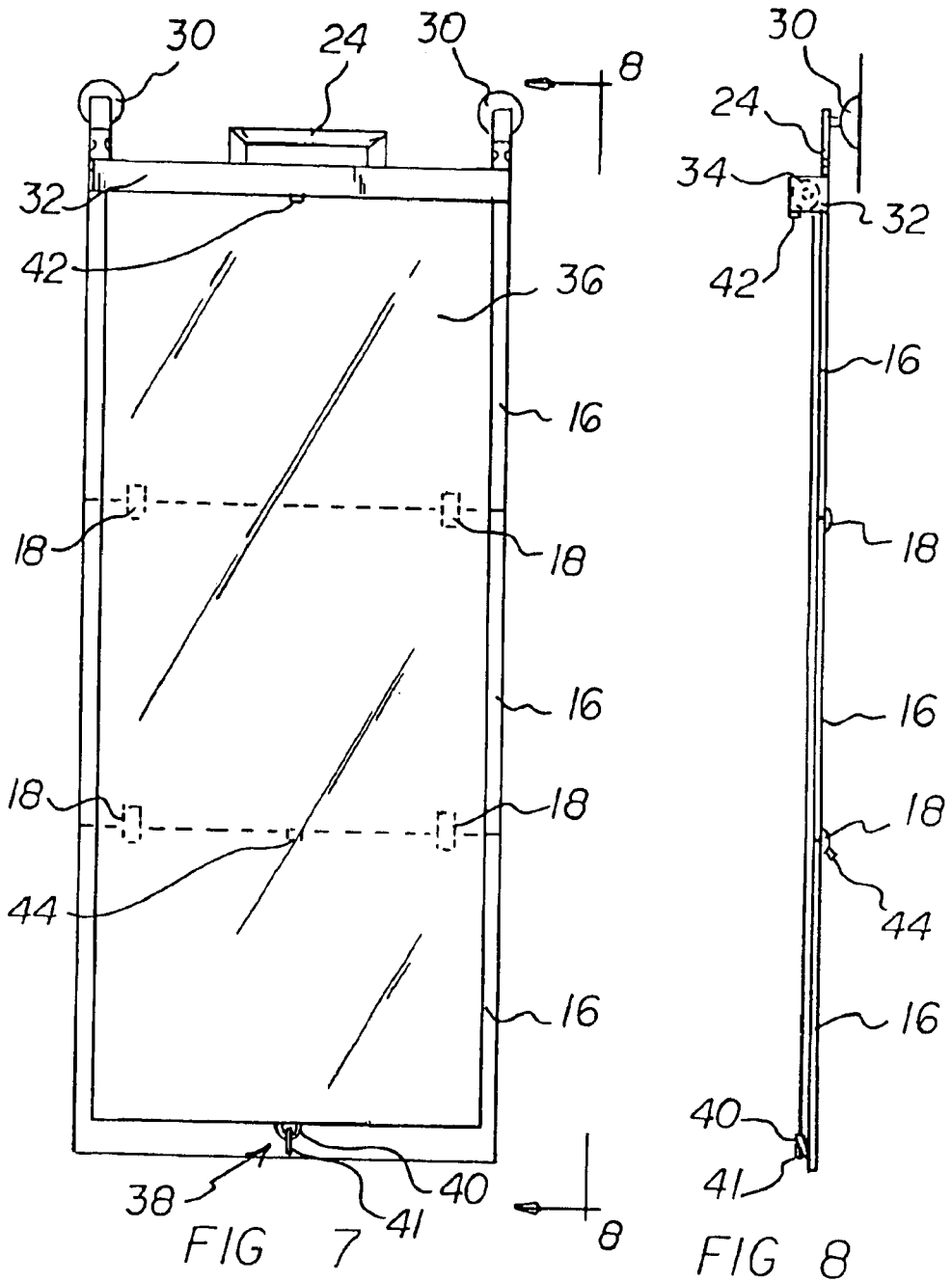
FIG. 7 is a front view of the embodiment of the full-size folding mirror and carry case apparatus of FIG. 6 in the fully unfolded condition and hanging from suction cups on wall.
FIG. 8 is a side view of the embodiment of the invention shown in FIG. 7 taken along line 8—8 thereof.
Figure 11:
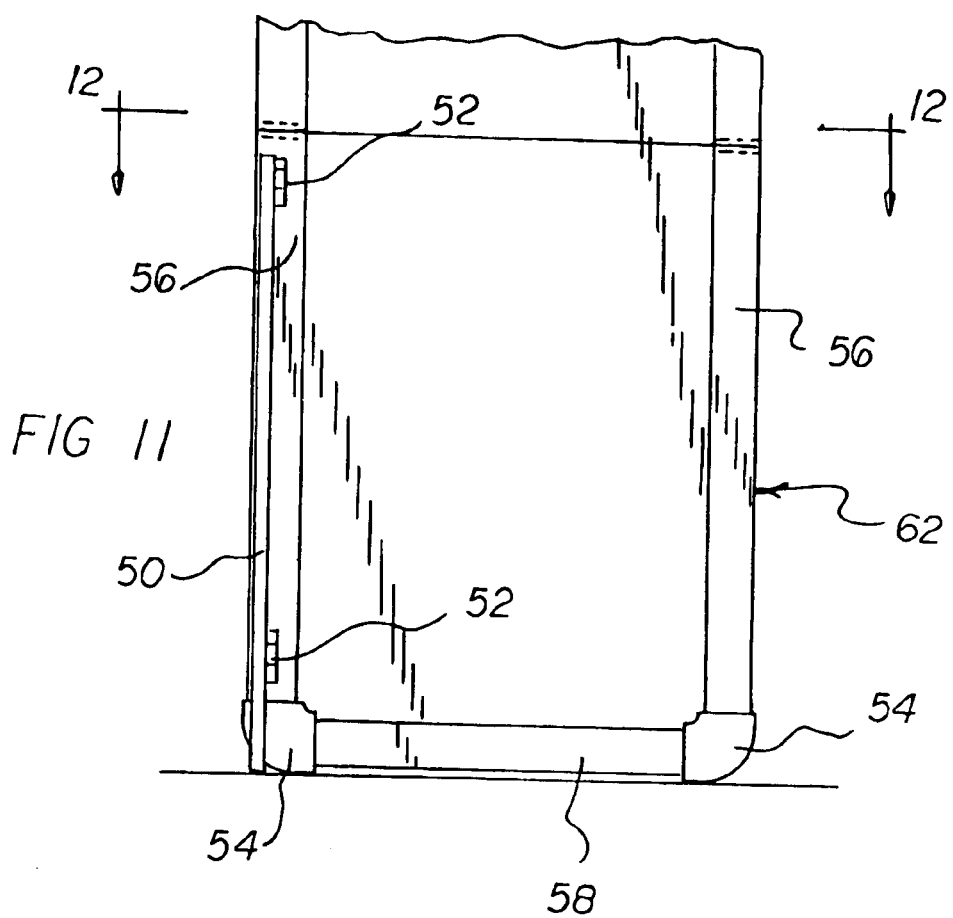
FIG. 11 is an enlarged partial rear view of the embodiment of the invention shown in FIG. 10 taken along line 11—11 thereof.

As shown in FIGS. 7 and 8, the apparatus is in the fully unfolded condition. The handle 24 can serve an additional function of hanging the fully unfolded mirror on a hook 11 that is supported by a wall or other vertical structure. Alternatively, the suction cups 30 can be used for supporting the foldable reflective surface support assembly on a wall or other vertical surface.

Once the foldable reflective surface support assembly is in the fully unfolded condition and is installed on a wall or other vertical surface, the sheet-attached ring 40 is grasped, and the reflective rollable (flexible) non-folded sheet 36 is unwound from the roller assembly 34. The reflective rollable sheet 36 is pulled downward to cover the front surfaces of the support panels 16 of the foldable reflective surface support assembly. The sheet-attached ring 40 is connected to the support-assembly-attached hook 41 to retain the reflective rollable non-folded sheet 36 in the fully extended condition to form a full length mirror.

When the full-size folding mirror of the second embodiment of the invention is to be transported to another location, the suction cups 30 are removed from the wall, the suction cups 30 are removed from the foldable reflective surface support assembly, and the apparatus is folded up into the folded up, carrying condition shown in FIG. 5. The folded up first panel lock member 42 is engaged with the folded up second panel lock member 44 to secure the apparatus in the folded up, carrying condition.

Turning to FIGS. 9–14, a third embodiment of the invention is shown. Reference numerals are shown that correspond to like reference numerals that designate like elements shown in the other figures. In addition, a horizontal-surface-supported mirror support member 50 is provided, and interconnection means are provided for connecting the horizontal-surface-supported mirror support member 50 to a bottommost support panel 16. Preferably, the interconnection means include support-member-to-support-panel hinges 52.

A topmost support panel 16 and a bottommost support panel 16 can include a pair of longitudinal side portions 56. For each topmost and bottommost panel, a transverse portion 58 and a pair of interconnection elbows 60 are connected between the longitudinal side portions 56 and the transverse portion 58. The bottommost interconnection elbows 60 serve as feet members for the apparatus when the apparatus is supported on a floor or other horizontal surface.

The panel-interconnection hinges 18 for successive support panels 16 can be located on opposite sides of the successive support panels 16.

To unfold the embodiment of the invention shown in FIGS. 9–14, attention is first directed to FIG. 14 in which the invention is shown in the folded up, carrying condition. To unfold this embodiment of the invention, the bottommost first panel 62 is rotated around the second panel 64 using the panel-interconnection hinges 18 is connected therebetween in the respective front sides of the respective panels, as shown by the bottommost counterclockwise unfolding arrow 46 in FIG. 10. Then, the third panel 66 is rotated around the second panel 64 using the panel-interconnection hinges 18 is connected therebetween in the respective rear sides of the respective panels, as shown by the intermediate counterclockwise unfolding arrow 46 in FIG. 10. Then, the topmost fourth panel 68 is rotated around the third panel 66 using the panel-interconnection hinges 18 is connected therebetween in the respective front sides of the respective panels as shown in FIG. 10. In this way, all of the support panels 16 are in the fully unfolded condition as shown in FIGS. 9 and 10.

Figure 12:
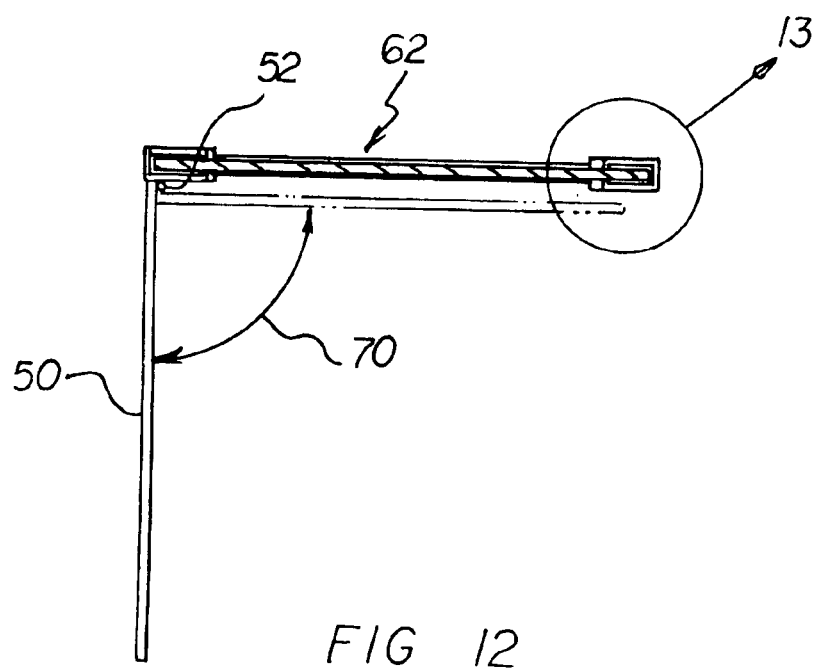
FIG. 12 is a cross-sectional view of the embodiment of the invention shown in FIG. 11 taken along line 12—12 thereof.

To use the horizontal-surface-supported mirror support member 50, the horizontal-surface-supported mirror support member 50 is rotated around the support-member-to-support-panel hinges 52 as shown by rotational arrow 70 in FIG. 12.

To return the third embodiment of the invention to the extremely compact folded up, carrying condition shown in FIG. 14, the reverse of the unfolding steps are carried out.

The components of the full-size folding mirror and carry case apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved full-size folding mirror and carry case apparatus that is low in cost, relatively simple in design and operation, and which may advantageously be used which has a relatively large reflective surface. With the invention, a full-size folding mirror and carry case apparatus provides a reflective surface which is not folded when the foldable mirror is folded up. With the invention, a full-size folding mirror and carry case apparatus provides a full-size mirror. With the invention, a full-size folding mirror and carry case apparatus provides for supporting the full-size mirror in a vertical orientation. With the invention, a full-size folding mirror and carry case apparatus provides for supporting the full-size mirror on a hook installed in a wall or other vertical surface. With the invention, a full-size folding mirror and carry case apparatus provides for supporting the full-size mirror with suction cups on a wall or other vertical surface. With the invention, a full-size folding mirror and carry case apparatus provides for supporting the full-size mirror on the floor. With the invention, a full-size folding mirror and carry case apparatus provides a floor support which is also foldable along with the foldable mirror.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed:

1. A folding mirror and carry apparatus, comprising:
   a foldable reflective surface support assembly which includes support panels connected together with panel-interconnection hinges,
   a non-folded reflective surface assembly supported by said foldable reflective surface support assembly,
   wherein said non-folded reflective surface assembly includes:
   a roller assembly housing connected to said foldable reflective surface support assembly,
   a roller assembly retained in said roller assembly housing, and
   a reflective rollable non-folded sheet supported by said roller assembly, said apparatus further comprising a folded condition locking assembly including:

a folded up first panel lock member connected to said roller assembly housing, and a folded up second panel lock member connected to said foldable reflective surface support assembly.

2. The apparatus of claim 1, further including:

a handle connected to said foldable reflective surface support assembly.

3. The apparatus of claim 1, further including:

a shoulder strap connected to said foldable reflective surface support assembly.

4. The apparatus of claim 1, further including:

a folded condition locking assembly connected to said foldable reflective surface support assembly for retaining said apparatus in a folded up, carrying condition.

5. The apparatus of claim 4 wherein said folded condition locking assembly includes:

a folded condition first locking member connected to one of said support panels, and a folded condition second locking member connected to another of said support panels, such that said foldable reflective surface support assembly is locked in the folded up, carrying condition.

6. The apparatus of claim 1 wherein said non-folded reflective surface assembly includes at least one panel-mounted non-folded reflective surface mounted on one side of one said support panels.

7. The apparatus of claim 1, further including:

an extended reflective rollable sheet locking assembly connected between said reflective rollable non-folded sheet and said foldable reflective surface support assembly.

8. The apparatus of claim 7 wherein said extended reflective rollable sheet locking assembly includes:

a sheet-attached ring connected to a distal end of said reflective rollable non-folded sheet, and a support-assembly-attached hook connected to said foldable reflective surface support assembly.

9. The apparatus of claim 1, further including:

suction cups connected to said foldable reflective surface support assembly.

10. The apparatus of claim 1, further including:

a horizontal-surface-supported mirror support member, and interconnection means for connecting said horizontal-surface-supported mirror support member to a bottommost support panel.

11. The apparatus of claim 10 wherein said interconnection means include support-member-to-support-panel hinges.

12. The apparatus of claim 1 wherein:

a topmost support panel and a bottommost support panel include a pair of longitudinal side portions, a transverse portion, and a pair of interconnection elbows connected between said longitudinal side portions and said transverse portion.

13. The apparatus of claim 12 wherein said bottommost interconnection elbows serve as feet members for said apparatus when said apparatus is supported on a floor or other horizontal surface.

14. The apparatus of claim 1 wherein said panel-interconnection hinges for successive support panels are located on opposite sides of said successive support panels.

* * * * *